United States Patent
Zock et al.

(10) Patent No.: US 11,938,770 B2
(45) Date of Patent: Mar. 26, 2024

(54) SHOCK ABSORBER MOUNTING ASSEMBLY

(71) Applicants: Richard Mellick Zock, Lapeer, MI (US); Miles John Zock, Lapeer, MI (US)

(72) Inventors: Richard Mellick Zock, Lapeer, MI (US); Miles John Zock, Lapeer, MI (US)

( * ) Notice: Subject to any disclaimer, the term of this patent is extended or adjusted under 35 U.S.C. 154(b) by 462 days.

(21) Appl. No.: 17/301,656

(22) Filed: Apr. 9, 2021

(65) Prior Publication Data
US 2021/0370737 A1 Dec. 2, 2021

Related U.S. Application Data

(60) Provisional application No. 62/972,837, filed on Feb. 11, 2020.

(51) Int. Cl.
  *B60G 13/00* (2006.01)
  *B60G 7/00* (2006.01)

(52) U.S. Cl.
  CPC .......... *B60G 13/005* (2013.01); *B60G 7/001* (2013.01); *B60G 7/005* (2013.01); *B60G 2204/129* (2013.01); *B60G 2204/143* (2013.01); *B60G 2204/416* (2013.01); *B60G 2204/43* (2013.01); *B60G 2206/12* (2013.01); *B60G 2206/124* (2013.01)

(58) Field of Classification Search
  CPC ...... B60G 13/005; B60G 7/001; B60G 7/005; B60G 2204/129; B60G 2204/143; B60G 2204/416; B60G 2204/43; B60G 2206/12; B60G 2206/124; B60G 2200/144; B60G 3/20
  See application file for complete search history.

(56) References Cited

U.S. PATENT DOCUMENTS

| 9,988,083 B1* | 6/2018 | Smith | B60G 3/20 |
| 11,130,378 B1* | 9/2021 | Lambert | B60G 7/008 |
| 2016/0059652 A1* | 3/2016 | Weifenbach | B62D 17/00 |
| | | | 280/124.144 |
| 2018/0281538 A1* | 10/2018 | Gordon | B62D 21/11 |
| 2018/0290511 A1* | 10/2018 | Gordon | F16C 11/0695 |
| 2021/0331543 A1* | 10/2021 | Zock | B60G 7/001 |

FOREIGN PATENT DOCUMENTS

| CN | 111032376 A * | 4/2020 | B60G 7/005 |
| WO | WO-2009106071 A1 * | 9/2009 | B23K 20/12 |

\* cited by examiner

*Primary Examiner* — Drew J Brown

(74) *Attorney, Agent, or Firm* — Dunlap Bennett & Ludwig, PLLC

(57) ABSTRACT

A shock absorber mounting assembly for an off-road vehicle is provided. The shock absorber mounting assembly may provide A-arm brackets dimensioned and adapted to interconnect body and wheel framing of the off-road vehicle, wherein the lower bracket adjustably engages a lower portion of the shock absorber. The present invention also enables any model year shock absorber to be adapted to operatively associate with the steering system of any off-road vehicle of the same make and model, regardless of model year, through a shock absorber adapter bracket assembly that attaches to the original equipment manufacturer A-arms of the off-road vehicle adding the non-model year shock absorbers. The brackets may be of unitary construction.

7 Claims, 9 Drawing Sheets

SHOCK ABSORBER MOUNTING ASSEMBLY

CROSS-REFERENCE TO RELATED APPLICATION

This application claims the benefit of priority of U.S. provisional application No. 62/972,837, filed 11 Feb. 2020, the contents of which are herein incorporated by reference.

BACKGROUND OF THE INVENTION

The present invention relates to utility vehicle shock absorbers and, more particularly, a shock absorber adapter bracket assembly.

Manufacturers of off-road vehicles (or "machines")—such as but not limited to utility vehicles (UTV), all-terrain vehicles (ATV), go karts, motor bikes, dirt bikes, and the like—have designed their shock absorbers differently throughout the years of production, for even the same model of machine. In other words, one model year (or group of model years) may have a different shock absorber design relative to a previous model year (or group of model years); for instance, the 1989-2004 Yamaha warrior front shock absorber will not fit a 1987 or 1988 machine, same with other machines. Therefore, users of off-road vehicles are currently forces to use the corresponding model year shock absorber for that specific year's machine.

Unfortunately, there is no adapter available that would enable the user to fit a shock absorber from one machine's model year on to a machine of the same model but from a different model year. A "lowering" kit could look similar but would not work under the same conditions and not this is not its purpose; rather they are made for lowering the stance of a machine instead of adapting all year shock absorbers for the same model of machine regardless of model year. Accordingly, these makeshift lowering-kit solutions tend to fail due to their unsuited design.

Furthermore, most suspension components, especially A-arms components, are weak and prone to bending, permanent deformation, and failure because (a) they are two or more pieces joined together and (b) suspension components are subject to repeated impact forces and stress, which can break the welds that join the pieces of the suspension component together, rendering the owner's vehicle inoperable. Purchasing and installing replacement components are expensive and take time.

As can be seen, there is a need for a shock absorber adapter bracket assembly enabling use of, in effect, an "all-year" shock absorber, whereby any model year shock absorber can be adapted to be operatively associated with the steering system of any off-road vehicle of the same make and model, regardless of model year. The present invention enables any model year shock absorber to be adapted to operatively associate with the steering system of any off-road vehicle of the same make and model, regardless of model year, through a shock absorber adapter bracket assembly that attaches to the original equipment manufacturer (OEM) A-arms of the off-road vehicle adding the non-model year shock absorbers. The material of the brackets is extremely high strength, in certain instances alloy steel.

The shock absorber adapter bracket assembly embodied in the present invention allows the all-year shock absorber to fit any year machine as long as the "model" is the same, providing a cost savings to the owners of such off-road vehicles. For instance, the 1987 or 1988 Yamaha warrior could sell for $150 or more, but if adapted to fit the 1989-2004 shock which could cost $80, the customer could purchase the 1989-2004 shock absorber to fit 1987 or 1988.

As can be seen, there is also a need for a system of A-arm suspension components of unitary construction for mounting of any shock absorber. The unitary construction of forged aluminum with or zero points of failure, embodiment in the present invention, can withstand higher tolerances than the prior art. The upper and lower A-arm suspension component/brackets may be square and entirely forged from aluminum or equivalent and can be dimensioned and adapted for all off-road vehicles. Again, the present invention also contemplates adaptable extended A-arms for all-year suspension components.

SUMMARY OF THE INVENTION

In one aspect of the present invention, a shock absorber mounting assembly includes the following: a bracket having two arms, each arm extending from a proximal end to a distal end, wherein said distal ends are joined; each proximal end having a straight ball joint; and said joined distal end having an angled ball joint; and further including: a top hole journaled through said joined distal end, wherein the angled ball joint includes: a ball joint post dimensioned to be threaded through the top hole; and a connector post, wherein an operative angle between the ball joint post and the connector post is between one hundred and five and one hundred and twenty-five degrees, and wherein certain embodiments the operative angle is selectively adjustable, and in some embodiments one or more shock forks are supported between the two arms.

In another aspect of the present invention, a system for mounting a shock absorber for a machine, the system including the following: an upper shock absorber adapter bracket having: two upper arms, each upper arm extending from a proximal end to a distal end, wherein said distal ends are joined; each proximal end having a straight ball joint; and said joined distal end having an angled ball joint; and a lower shock absorber adapter bracket having: two lower arms, each lower arm extending from a proximal end to a distal end, wherein said distal ends are joined; each proximal end having a straight ball joint; said joined distal end having an angled ball joint; and one or more shock forks between the two lower arms, wherein said angled ball joints couple to two attachment points, respectively, of a wheel frame of the machine, and wherein a lower portion of said shock absorber operatively associates with the one or more shock forks; and in certain embodiments further including a top hole journaled through said joined distal end of each bracket; wherein each angled ball joint has: a ball joint post dimensioned to be threaded through the top hole; and a connector post, wherein for each angled ball joint, an operative angle between the ball joint post and the connector post is between one hundred and five and one hundred and twenty-five degrees, and wherein some embodiment the operative angle is selectively adjustable, and wherein the upper and lower straight ball joints operatively associated with an upper and lower frame, respectively, of the machine, and wherein the upper and lower operative angles are supplementary.

In yet another aspect of the present invention, method of mounting a shock absorber to an off-road vehicle or for adapting a first shock absorber of a first off-road vehicle of a first model year with a second off-road vehicle of a second model year, the method including: providing the above-mentioned system; operatively associating the upper and lower straight ball joints with an upper and lower frame, respectively, of the second off-road vehicle; operatively associating the angled ball joints to two attachment points of a wheel frame of the second off-road vehicle; and operatively associating a lower portion of the first shock absorber with the one or more shock forks; and selectively adjusting the operative angle of at least one of said angled ball joints, and in certain embodiments wherein the upper and lower operative angles are selectively adjusted to be supplementary.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a shock absorber mounting assembly for an off-road vehicle. The shock absorber mounting assembly may provide A-arm brackets dimensioned and adapted to interconnect body and wheel framing of the off-road vehicle, wherein the lower bracket adjustably engages a lower portion of the shock absorber. The present invention also enables any model year shock absorber to be adapted to operatively associate with the steering system of any off-road vehicle of the same make and model, regardless of model year, through a shock absorber adapter bracket assembly that attaches to the original equipment manufacturer (OEM) A-arms of the off-road vehicle adding the non-model year shock absorbers. The brackets may be of unitary construction.

Figure 5:
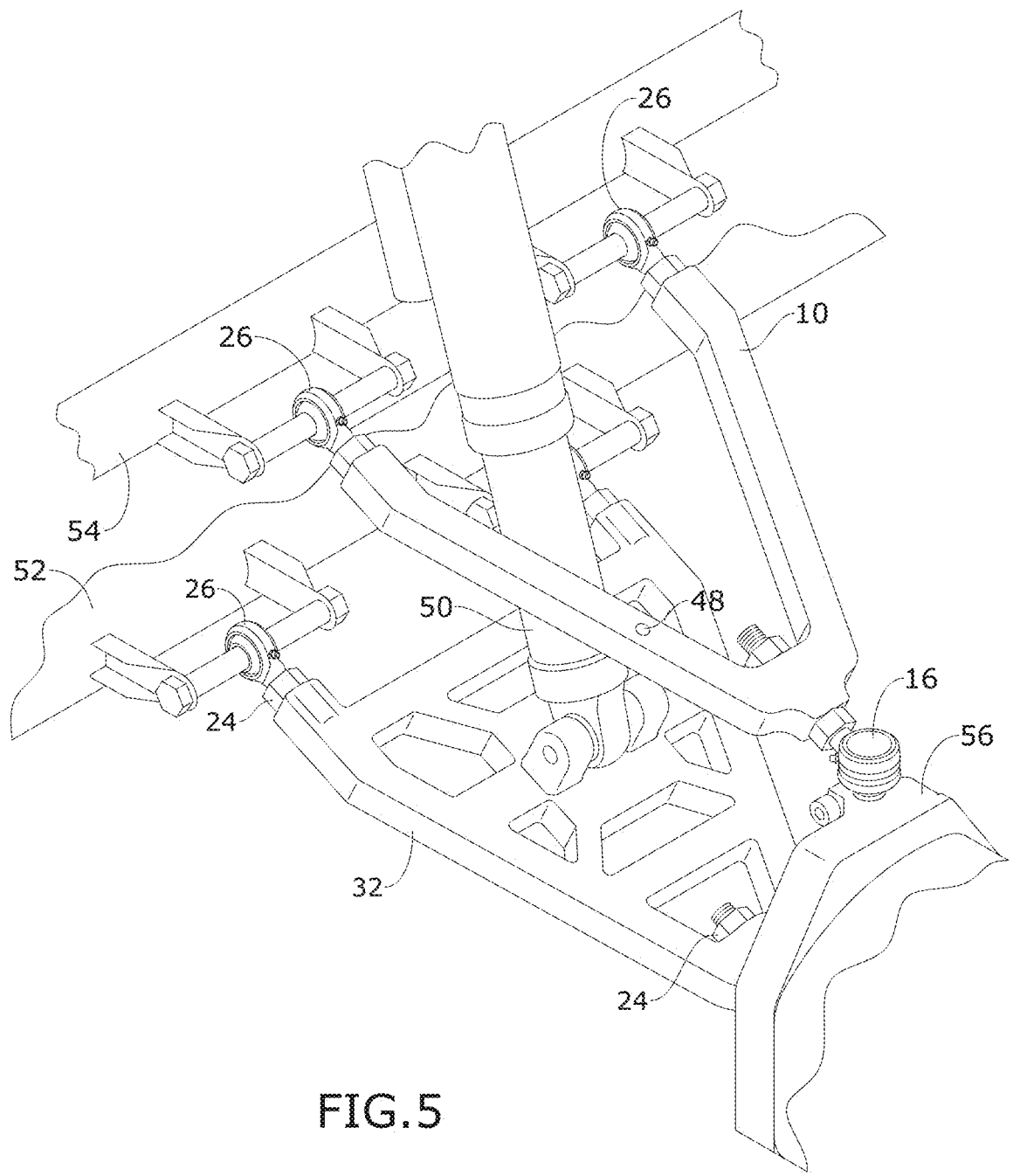
FIG. 5 is a perspective view of an exemplary embodiment of the present invention, shown in an installed condition.
Figure 6:
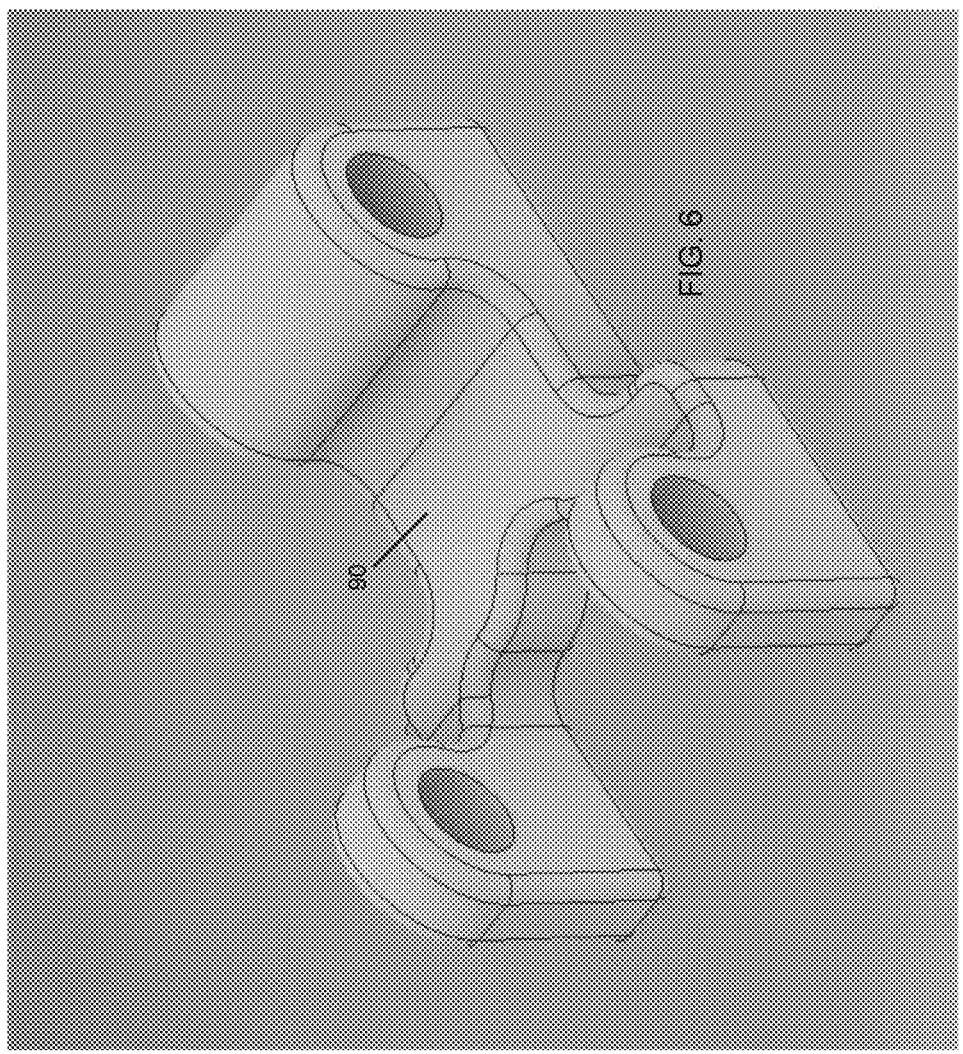
FIG. 6 is a perspective view of an exemplary embodiment of the present invention.
Figure 7:
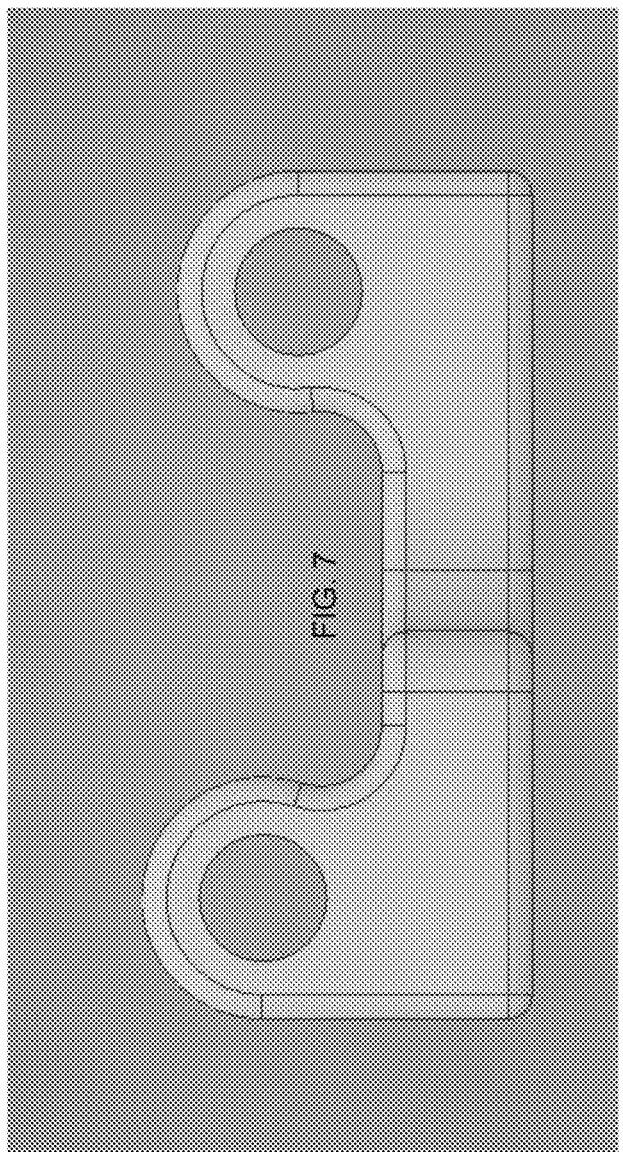
FIG. 7 is a side elevation view of an exemplary embodiment of the present invention.
Figure 8:
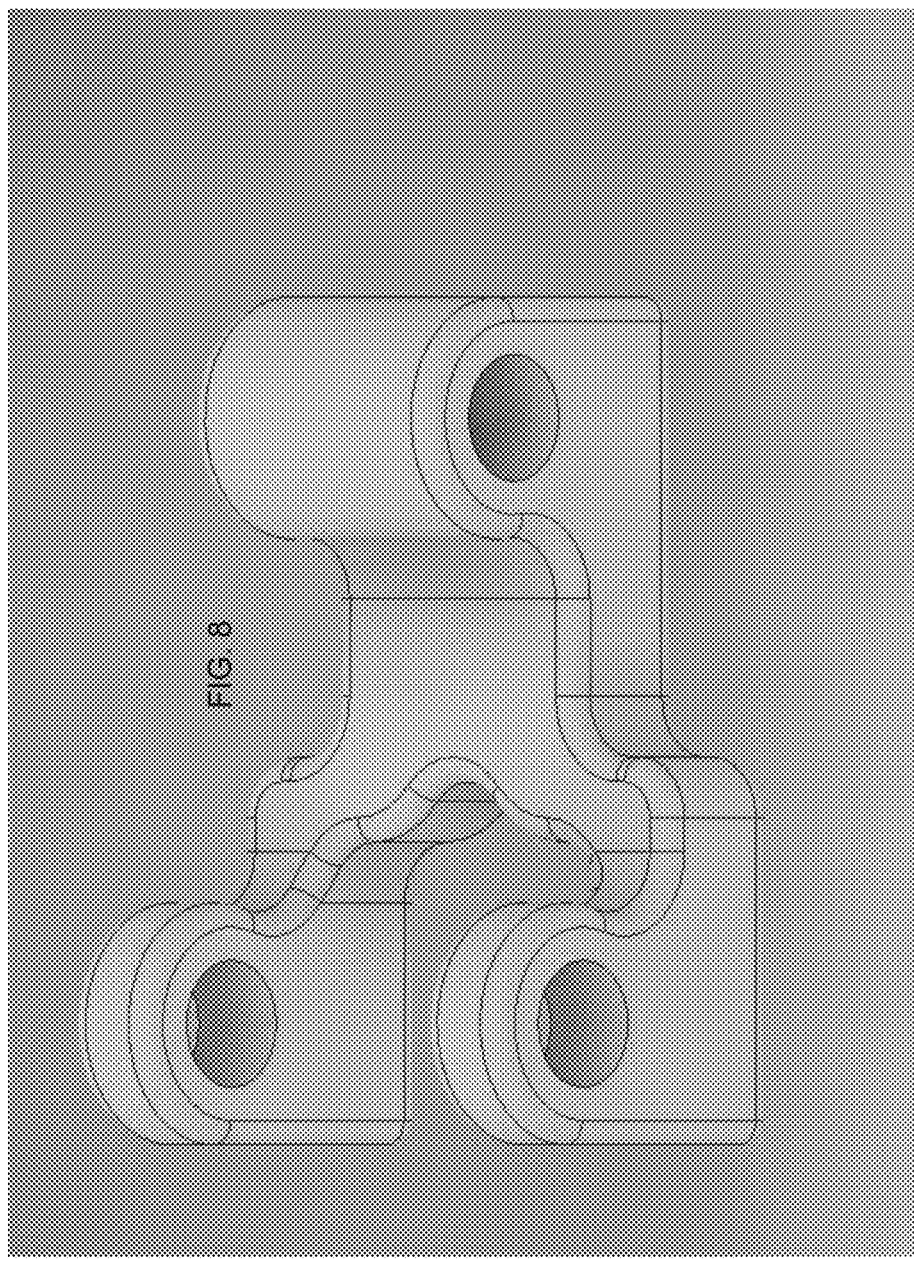
FIG. 8 is a perspective view of an exemplary embodiment of the present invention.
Figure 9:
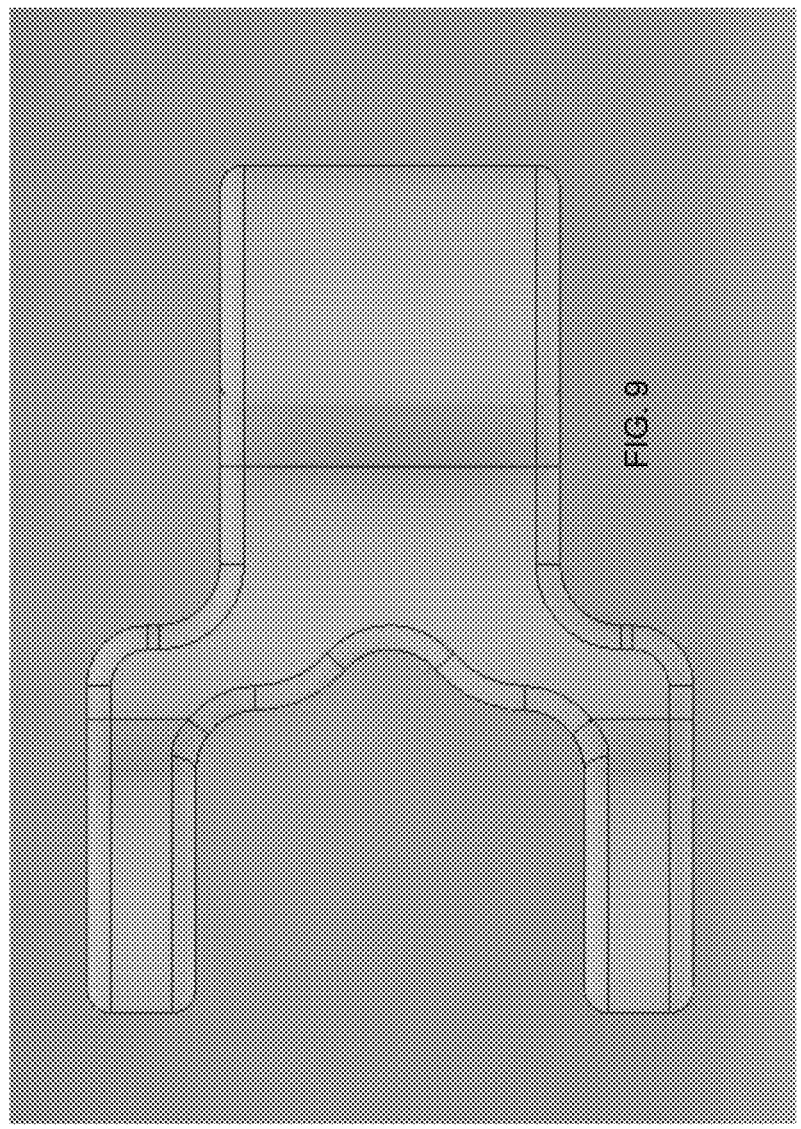
FIG. 9 is a top plan view of an exemplary embodiment of the present invention.
Figure 10:
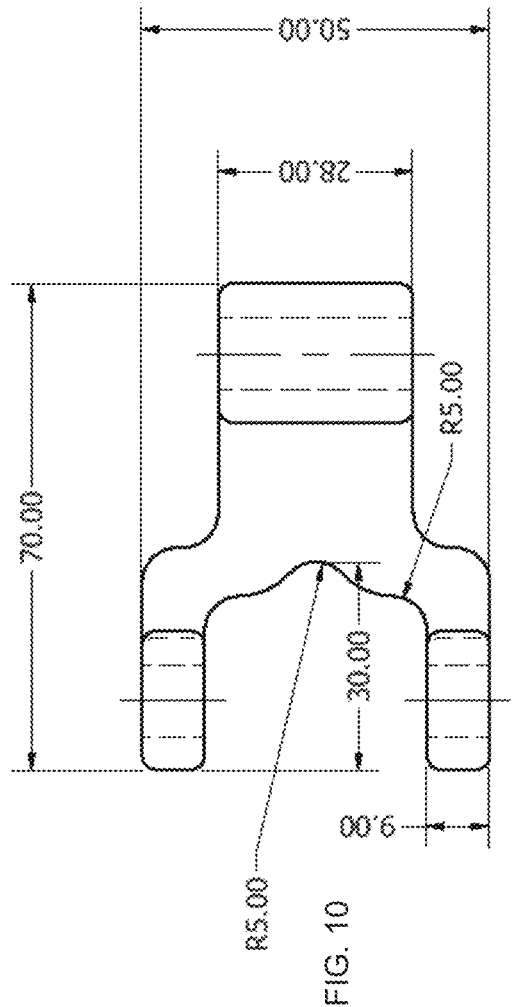
FIG. 10 is a top plan view of an exemplary embodiment of the present invention.
Figure 11:
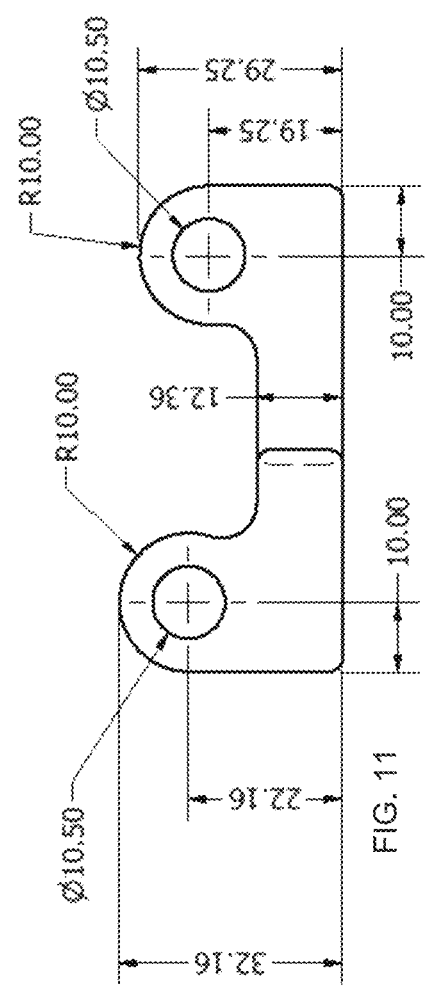
FIG. 11 is a side elevation view of an exemplary embodiment of the present invention.

It should be understood by those skilled in the art that the use of directional terms such as upward (e.g., "upper", "top", etc.) and downward (e.g., "lower") (inner) and the like are used in relation to the illustrative embodiments as they are depicted in the figure: specifically, the upward direction being toward the top margin of FIG. 5 for all corresponding figures, and the downward direction being toward the bottom of FIG. 5 for all corresponding section figures.

Referring now to FIGS. 1 through 11, the present invention may include a shock absorber adapter bracket assembly 100. The shock absorber adapter bracket assembly 100 may include an upper bracket 10 and a lower bracket 32 interconnecting an upper frame 54 and lower frame 52 of a machine, respectively, to a wheel frame 56 at two different attachment points, as illustrated in FIG. 5.

Figure 1:
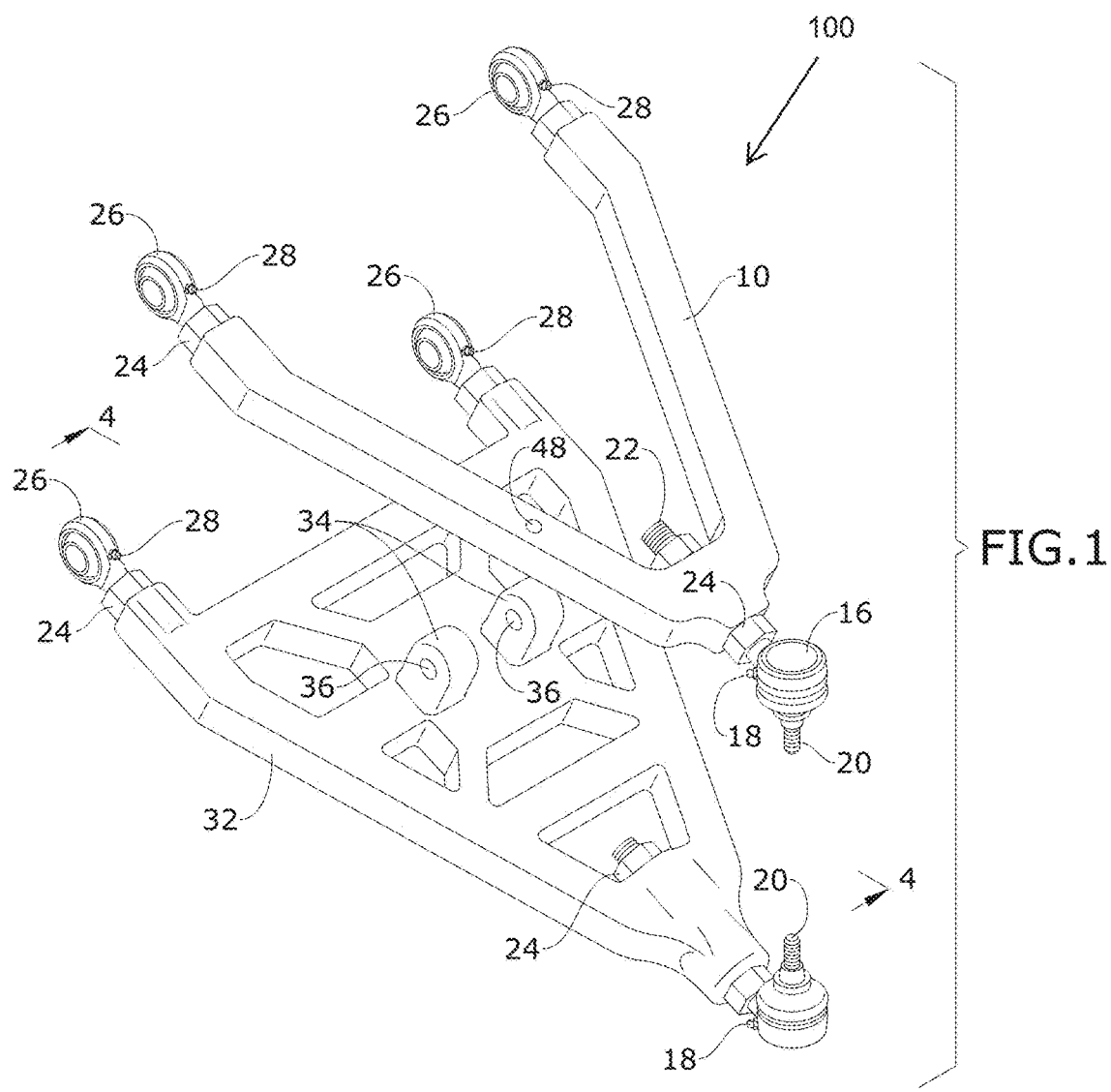
FIG. 1 is a perspective view of an exemplary embodiment of the present invention.
Figure 2:
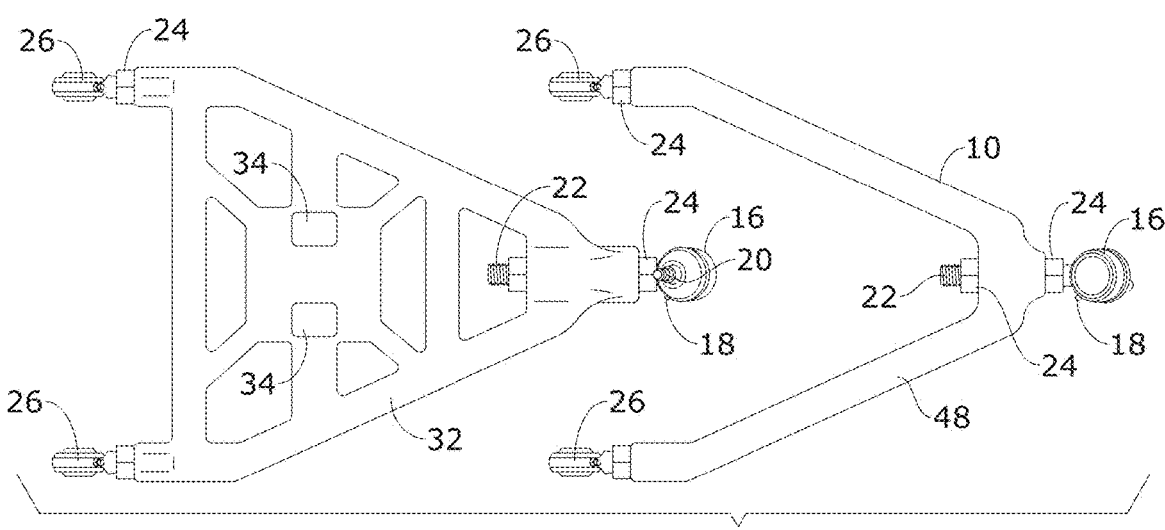
FIG. 2 is a top plan view of an exemplary embodiment of the present invention.
Figure 3:
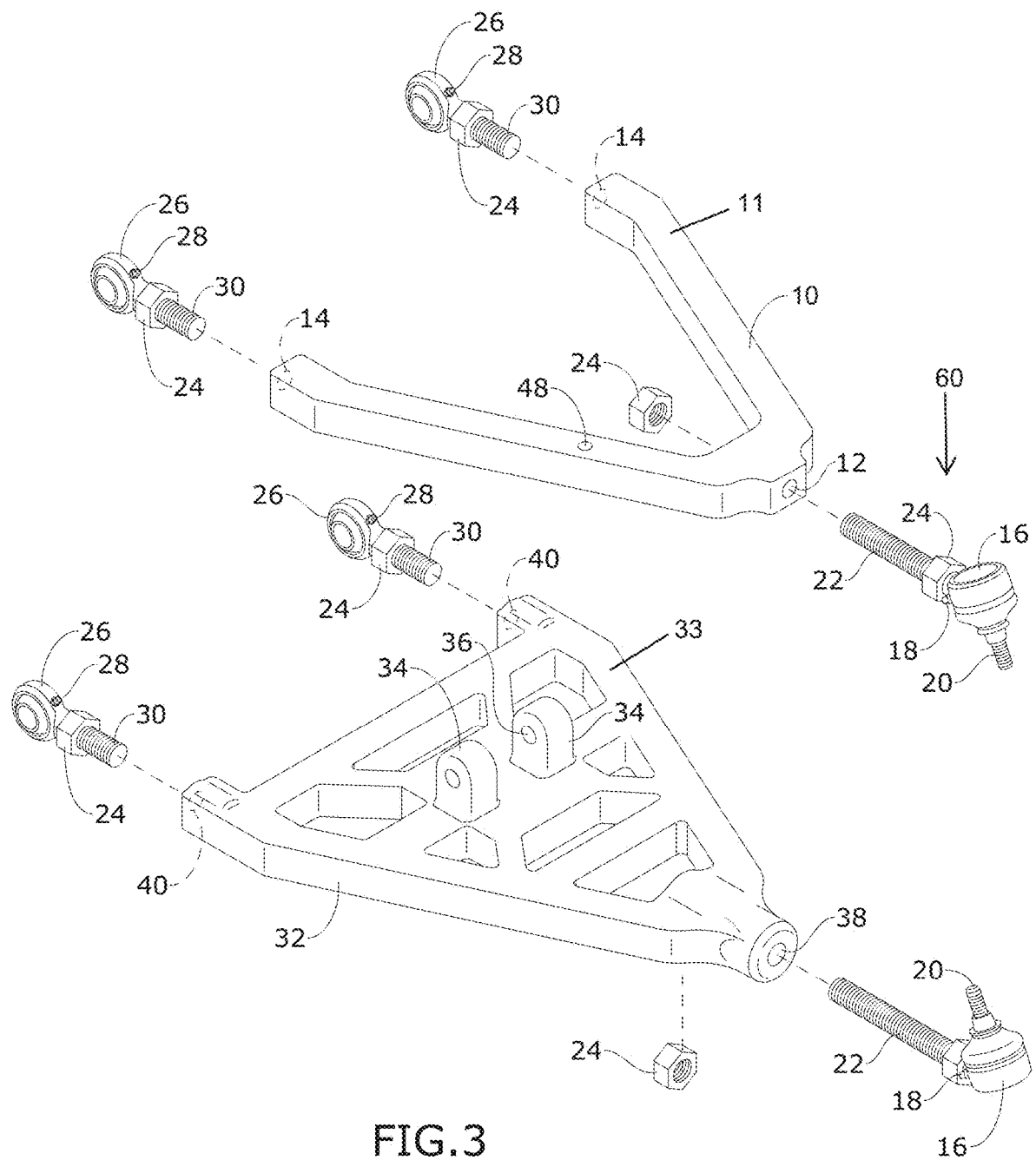
FIG. 3 is an exploded perspective view of an exemplary embodiment of the present invention.

Each bracket 10 and 32 provides two arms 11 and 33, respectively, that extend from a proximal end of the brackets 10 and 32 and converge at a distal end of the brackets 10 and 32, forming a V-shape, as illustrated in FIG. 3. Accordingly, both arms 11 or 33 together may be referred to as "A-arms". The lower bracket may have reinforcement between two arms 33 to, among other things, support a pair of shock forks 34. The upper bracket 10 may have a face hole 48 along an upper face of one of the arms 11. Each shock fork 34 may provide an interface 36 or hole dimensioned and adapted to operatively associate with the shock absorber 50, as illustrated in FIG. 5.

Each proximal end of the bracket's two arms 11 and 33 have arm holes 14 and 40, respectively. Each distal end of the bracket two arms 11 and 33 have a top hole 12 and 38, respectively.

Figure 4:
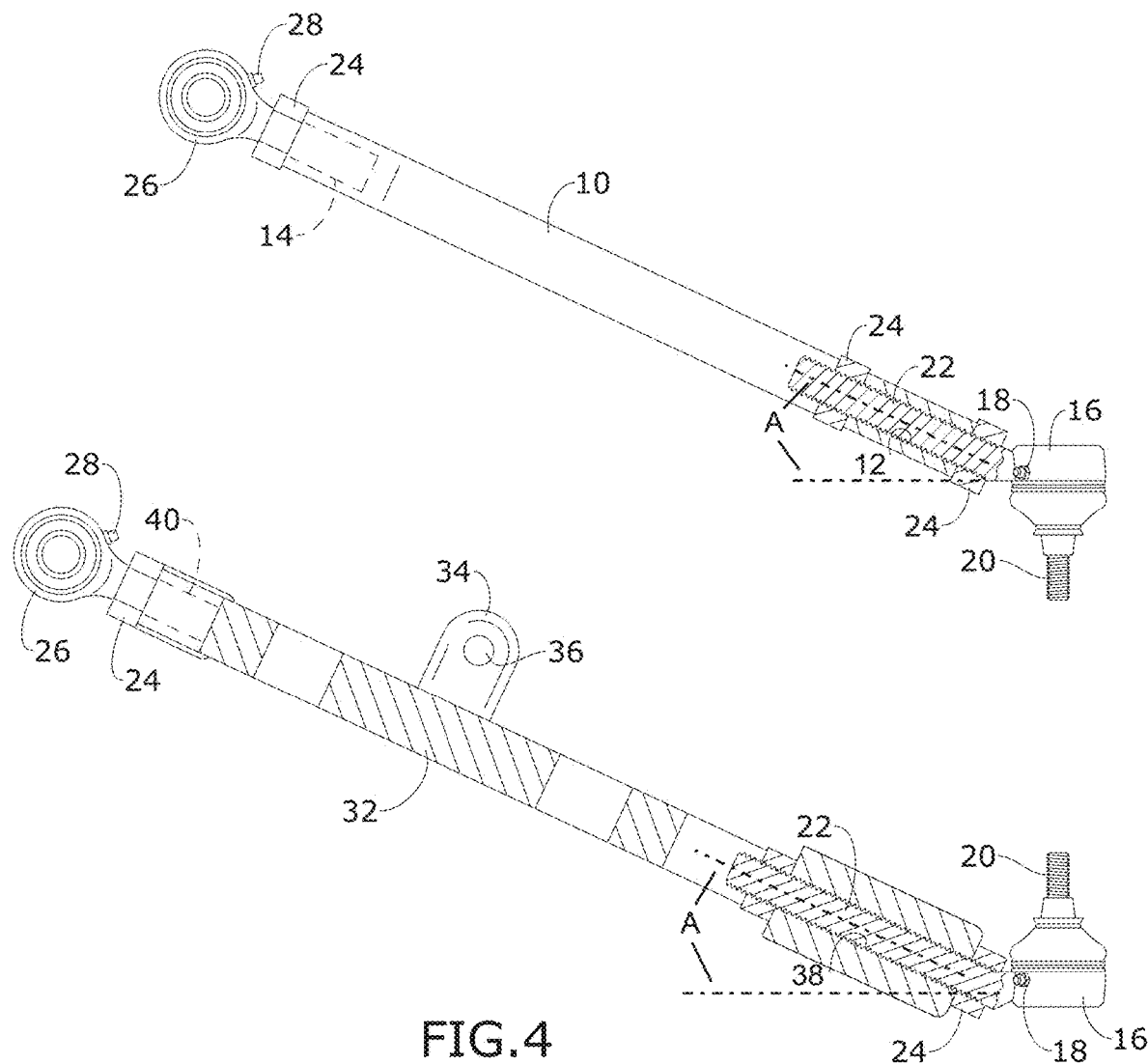
FIG. 4 is a section view of an exemplary embodiment of the present invention, take along line 4-4 in FIG. 1.

Each top hole 12 and 38 enable a ball joint assembly 60 to couple to the distal end. Specifically, each top hole 12 and 38 may be journaled entirely through their respective distal end. Each ball joint assembly 60 provides an angled ball joint 16 operatively associated with a ball joint post 22. The ball joint post 22 is dimensioned to thread entirely through the respective distal end, by way of the top hole 12 or 38, so that a nut or other equivalent fastener 24 can secure the ball joint port 22 on each side of the distal end, as illustrated in FIGS. 3 and 4. In certain embodiments, this angle of incidence, A, may be adjustable, and may be from fifteen to thirty-five degrees. The angle of incidence, A, facilitates the adaptability of the "all-year" shock absorber 50 to any machine of the same make and model, regardless of model year.

Each angled ball joint 16 may provide a threaded connector post 20 dimensioned and adapted to connect to the wheel frame 56. The connector post 20 may be a bearing stud that may be tapered and threaded or otherwise adapted to fit a hole provided by the wheel frame 56, for instance in a steering knuckle of the wheel frame 56. The angled ball joint 16 enables adjustability in this connection through allowing a limited range of smooth movement in all directions. The angled ball joint 16 may have a ball joint grease fitting 18 (or "grease nipple") for greasing the ball joint when needed. The angled ball joint 16 may have an angle of incidence ('A' in FIG. 4) of the ball joint post 22 and a horizontal axis (parallel with the supporting surface of the vehicle/machine). Accordingly, in FIG. 4, it can be seen that an operative angle between the ball joint post 22 and the connector post 20 for the upper bracket 10 is between 105 and 125 degrees, while the operative angle between the ball joint post 22 and the connector post 20 for the lower bracket 10 is between 85 and 65 degrees. Whereby, the upper and lower operatively angles may be 'supplementary'.

Turning to the proximal end of the brackets 10 and 32, in particular, the arm holes 14 or 40 that are dimensioned and adapted to operatively associate with a respective straight ball joint assembly 70. Each straight ball joint assembly 70 may include a straight ball joint 26 operatively associated with a threaded straight ball joint post 30. Each straight ball joint 26 also may have a grease fitting 28 (or "grease nipple"). The straight ball joint 26 may be dimensioned and adapted to slidably receive an elongated fastener of the upper and lower frames 54 and 52, respectively, as illustrated in FIG. 5. The straight ball joint post 30 is dimensioned to thread entirely through the respective proximal end, by way of the top hole 14 or 40, so that a nut or other equivalent fastener 24 can secure the straight ball joint post 30 on each side of the respective proximal end, as illustrated in FIGS. 3 and 4.

A method of making and using the present invention may include the following. The shock absorber adapter bracket assembly 100 disclosed above may be provided through accommodating for the tolerance the relevant shock absorber 50 to be operatively associated with the machine, and that machine's suspension system, dimensions and the like.

A method of installing the shock absorber adapter bracket assembly 100 may include, but not be limited to, removing the lower part of the pre-existing shock absorber and brackets, followed by installing the lower bracket 32. The ball joints may be screwed in and adjusted to the upper A-arm bracket 10 that is then fitted to the frame 54 and 56 by the bolts, nuts, and washers. Likewise, the ball joints may be screwed in and adjusted to the lower A-arm bracket 32 that is then fitted to the frame 52 and 56 by the bolts, nuts, and washers, without tightening the fasteners. The ball joints are used for mounting the A-arms brackets to the frames 52 and 54 as well as fitting to the steering system of the wheel frame 56. The adjustable ball joints can be shuffled between the different left-or right-side A-arms including upper or lower side A-arms.

Then install the lower part of the "all-year" shock absorber 50 into place on the lower bracket 32 and fastening it to its pair of shock forks 34 by sliding a fastener through the fork holes 36 and mounted to the appropriate fitment. Once assembly is complete, the fasteners 20, 30, 22, and 24 may be tightened.

The present invention may embody an extended A-arm kit using the same components that are assembled and use as described herein.

Alternatively, the shock absorber adaptor bracket 90 (see FIG. 6) can be attached directly to OEM A-Arms, as opposed to the A-arms shown in FIGS. 1-5.

It should be understood, of course, that the foregoing relates to exemplary embodiments of the invention and that modifications may be made without departing from the spirit and scope of the invention as set forth in the following claims.

What is claimed is:

1. A shock absorber mounting assembly, comprising:
a bracket having two arms, each arm extending from a proximal end to a distal end, wherein said distal ends are joined;
each proximal end having a straight ball joint;
said joined distal end having an angled ball joint;
a top hole journaled through said joined distal end, wherein the angled ball joint comprises:
    a ball joint post dimensioned to be threaded through the top hole; and
    a connector post,
wherein an operative angle between the ball joint post and the connector post is between one hundred and five and one hundred and twenty-five degrees, and wherein the operative angle is selectively adjustable.

2. The shock absorber mounting assembly of claim 1, further comprising one or more shock forks between the two arms.

3. A system for mounting a shock absorber for a machine, the system comprising:
an upper shock absorber adapter bracket, comprising:
    two upper arms, each upper arm extending from a proximal end to a distal end, wherein said distal ends are joined;
    each proximal end having a straight ball joint; and
    said joined distal end having an angled ball joint; and
a lower shock absorber adapter bracket, comprising:
    two lower arms, each lower arm extending from a proximal end to a distal end, wherein said distal ends are joined;
    each proximal end having a straight ball joint;
    said joined distal end having an angled ball joint; and
    one or more shock forks between the two lower arms,
wherein said angled ball joints couple to two attachment points, respectively, of a wheel frame of the machine, and wherein a lower portion of said shock absorber operatively associates with the one or more shock forks;
a top hole journaled through said joined distal end of each bracket;
wherein each angled ball joint comprises:
    a ball joint post dimensioned to be threaded through the top hole; and
    a connector post,
wherein for each angled ball joint, an operative angle between the ball joint post and the connector post is between one hundred and five and one hundred and twenty-five degrees, and wherein the operative angle is selectively adjustable.

4. The system of claim 3, wherein the upper and lower straight ball joints operatively associated with an upper and lower frame, respectively, of the machine.

5. The system of claim 3, wherein the upper and lower operative angles are supplementary.

6. A method of mounting a first shock absorber to an off-road vehicle, the method comprising:
providing the system of claim 3;
operatively associating the upper and lower straight ball joints with an upper and lower frame, respectively, of the second off-road vehicle;
operatively associating the angled ball joints to two attachment points of a wheel frame of the second off-road vehicle;
operatively associating a lower portion of the first shock absorber with the one or more shock forks; and
selectively adjusting the operative angle of at least one of said angled ball joints.

7. The method of claim 6, wherein the upper and lower operative angles are selectively adjusted to be supplementary.

\* \* \* \* \*